United States Patent [19]

Yamasaki et al.

[11] 4,109,880
[45] Aug. 29, 1978

[54] SPINNING REEL HAVING OVERRIDEABLE FRICTION BRAKE FOR PREVENTING BAIL RELEASE

[75] Inventors: Tatuya Yamasaki, Fuchu; Kounin Sazaki, Fukuyama, both of Japan

[73] Assignee: Ryobi Ltd., Fuchu, Japan

[21] Appl. No.: 803,921

[22] Filed: Jun. 6, 1977

[30] Foreign Application Priority Data

Jun. 11, 1976 [JP] Japan .............................. 51-76510[U]

[51] Int. Cl.² .............................................. A01K 89/01
[52] U.S. Cl. ............................................ 242/84.21 R
[58] Field of Search ................. 242/84.21 R, 84.21 A, 242/84.2 G, 84.2 H, 84.2 F, 84.2 E, 84.2 D, 84.2 R, 84.1 R

[56] References Cited

U.S. PATENT DOCUMENTS

| | | | |
|---|---|---|---|
| 3,045,942 | 7/1962 | Henze | 242/84.21 R |
| 3,586,255 | 6/1971 | Monthulet | 242/84.21 R |
| 4,005,832 | 1/1977 | Yamazaki | 242/84.21 R |

*Primary Examiner*—Billy S. Taylor
*Attorney, Agent, or Firm*—Sughrue, Rothwell, Mion, Zinn and Macpeak

[57] ABSTRACT

A spinning reel of the type having a bail arm and wherein an L-shaped kick lever rotating synchronously with the reel rotor engages a trip tab to thereby release the bail arm, further includes a braking surface immediately preceding the trip tab in the path of the projection. While the bail arm is cocked, slight rotation of the rotor due to eccentric weight distributions will be arrested when the braking surface frictionally engages the projection, thereby preventing premature and inadvertent release of the bail arm. The frictional engagement is relatively light, and may easily be overridden by turning the reel handle to thereby release the bail arm when desired.

4 Claims, 7 Drawing Figures

SPINNING REEL HAVING OVERRIDEABLE FRICTION BRAKE FOR PREVENTING BAIL RELEASE

BACKGROUND OF THE INVENTION

This invention relates to a spin fishing reel having an overrideable friction brake device for preventing the bail from inadvertently being released from its casting or latched position and snapping back into its retrieve position.

In the conventional spinning reel the pivotally mounted bail is latched in its cocked or casting position against the force of a return spring by a mechanical detent mechanism, and is automatically released to return to its line retrieve position during the initial revolution of the handle driven rotor. Such release is usually implemented by a projection on a kick lever mounted on the rotor striking a fixed trip or cam tab mounted on the stationary reel body. A problem sometimes exists, however, particularly after the reel mechanism becomes thoroughly worn-in and frictionally "loose" from prolonged usage, whereby the bail is inadvertently released and snaps back into its retrieve position during casting. The effects thereof can be annoying at best, possibly resulting in line breakage and the loss of the lure or bait, and even potentially dangerous as when the abruptly halted fishook swings back and strikes the caster. Such premature bail release is caused by rotational imbalances owing to the design of the reel handle and the offset position of the cocked bail, and the attendant rotational inertia forces developed during the backswing of the fishing rod and its subsequent rapid forward casting motion. That is, such eccentric weight distribution sometimes causes the reel rotor to revolve with sufficient velocity to release the latched bail when the kick lever projection strikes the trip tab.

SUMMARY OF THE INVENTION

Briefly, and according to the present invention, a spinning reel includes a spring biased bail arm secured at one end to a pivot cam rotatably mounted on a post extending out from a support housing integral with the reel rotor. The pivot cam carries a C-shaped cam face of increasing radius, adapted to engage a detent on a spring biased, slidably mounted, L-shaped kick lever having a projection on its upper end. The latter is positioned to strike a trip tab on a stationary key plate when the rotor is turned with the bail arm cocked. This forces the kick lever inwardly to release the bail arm, and as it swings over to the rewind position the cam face moves the kick lever further inward to thereby provide rotational clearance between the projection and the tab. A pair of flexible brake tabs are disposed on opposite sides of the trip tab and spaced therefrom in the path of the kick lever projection when the bail arm is cocked, and slidingly frictionally engage the projection if the rotor turns due to eccentric weight distributions to thereby prevent the premature and inadvertent release of the bail arm. The frictional engagement is relatively light, and may easily be overridden by turning the reel handle to thereby release the bail arm when desired.

DETAILED DESCRIPTION OF THE PREFERRED EMBODIMENT

Figure 1:
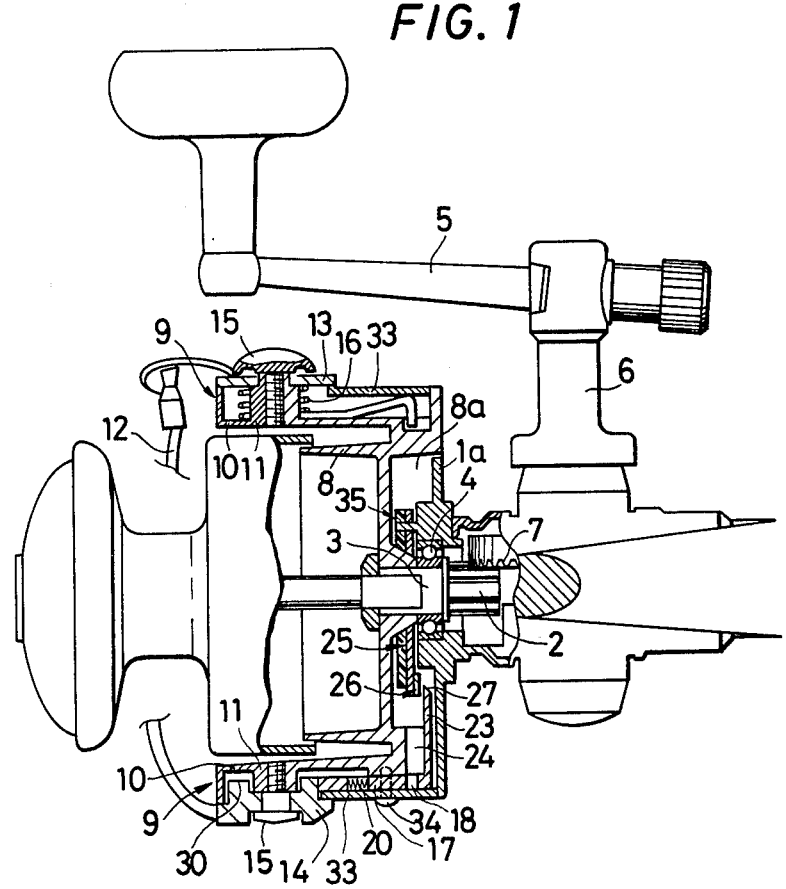
FIG. 1 shows a side view, partly in section, of a spinning reel provided with a bail release preventing device according to the present invention, FIG. 2 (a) shows a rear view of the braking system according to the present invention, FIG. 2 (b) shows an explanatory diagram schematically illustrating the positional relationships between the kick lever projection, the trip tab, and the braking tabs in the reel of FIG. 1.

Referring now to the drawings, a pair of support housings 9, 9 are symmetrically disposed on diametrically opposite sides of a rotor 8, which is mounted through a bearing 4 on a tubular shaft 3 to a reel body 1. The shaft 3 has a pinion 2 at one end, and is rotated by a handle 5 coupled thereto by a main gear 7 fitted on the inner end of a handle shaft extending through a housing 6. A bail arm 12 is pivotally mounted on posts 11, 11 projecting radially outwardly from the bottom walls of the respective support housings 9, 9. The bail arm is coupled to a lever 13 at one end and to a pivot cam 14 at the other end, both of which are pivotally mounted to the posts 11, 11 by shouldered step screws 15, 15. A torsion spring 16 is coiled about one of the posts 11, and is connected at one end to the bail arm lever 13 and at the other end to a wall of the upper support housing 9, to thereby bias the bail arm toward a rewind or retrieval position. In the other or lower support housing 9, a square column 17 projects from the bottom wall thereof at a proper spacing from the pivot post 11. A kick lever 19 having an elongated slot 18 in one portion thereof is slidably supported within the lower support housing 9 on the square column 17, which engages the slot 18. A spring 20 is disposed between one end of the slot 18 and the column 17, thereby biasing the kick lever 19 towards the pivot cam 14. The kick lever 19 has a detent projection 21 at one end thereof, which is adapted to engage and latch the pivot cam 14.

Figure 5:
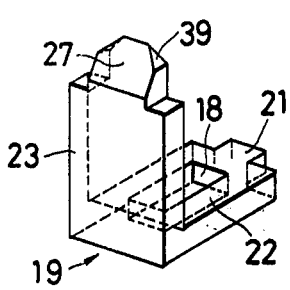
FIG. 5 shows a perspective view of the kick lever.

The kick lever 19 has an L-shaped contour, as viewed in FIG. 5 which consists of a horizontally extending portion 22 having the slot 18 and detent projection 21, and an upright portion 23 which extends radially inwardly through a peripheral groove 24 in the rotor 8. The top of the upright portion 23 is engageable with the trip tab 26 of a kick lever key plate 25, which also serves as a retainer for the bearing 4. The key plate is fastened by screws to the front end of the reel body 1 in such a manner as to be positioned within a rear recess 8a of the rotor 8 as viewed in FIG. 1. The recess is closed by a reel body flange 1a to protect the bearing and internal mechanism.

The top of the upright portion 23 of the L-shaped kick lever 19 is formed with a projection 39 having two inclined, symmetrical side faces and the trip tab 26 opposing the projection 39 has an arcuate or curved rear face 26'.

The kick lever 19 is positioned such that the projection 39 is in the path of the tab 26 of the key plate 25 when the cocked bail arm is rotated, whereby the tab cams the kick lever rearwardly to a retracted position.

Figure 2A:
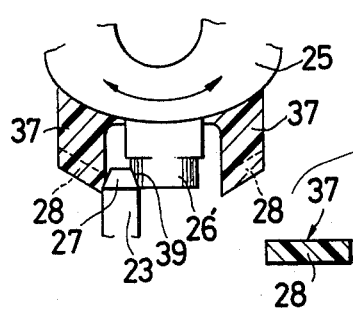
Figure 2B:
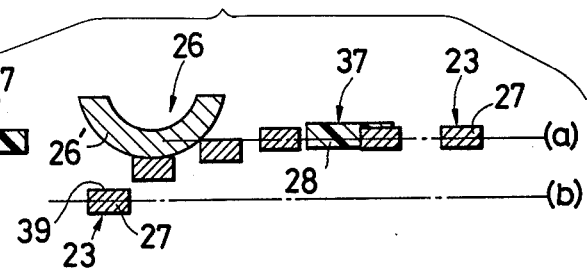
Figure 6:
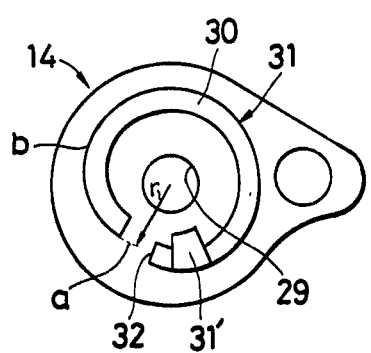
FIG. 6 is a view of the bail arm pivot cam from the inside of the reel of FIG. 1.

Referring to FIG. 6, the pivot cam 14 has a sleeve portion 30 which projects from one side of the cam around a central hole 29 for the shoulder of the step screw 15, whereby the outer peripheral surface of the sleeve portion serves as a cam face 31. The sleeve portion 30 is C-shaped rather than being a full or closed circle, and has an opening 32 for receiving the detent 21 of the kick lever 19, the opening being located in a portion of the cam face which has the smallest radius $r$ from the center of the pivot hole. The position of the opening 32 is such that the detent 21 engages or enters it when the bail arm 12 is manually swung into a cocked position, and the detent contacts the large radius portion $b$ of the cam face 31 when the bail arm is in a rewind position, as shown by the solid lines in FIG. 2. The relative size of the pivot cam 14 and the kick lever 19 should be such that when the detent 21 is in contact with the cam face portion $b$, the projection 39 of the kick lever remains positively spaced or disengaged from the trip tab 26 of the key plate 25, whereby free rotation and line retrieval is enabled.

When the bail arm is in the fishing line take-up or retrieval position the detent 21 is held in contact with the portion $b$ of the cam face 31 so that the kick lever 19 is urged to the right as viewed in FIG. 1 against the force of the spring 20, whereby the projection 39 clears the stationary trip tab 26 of the key plate 25. Thus, there is no fear under this condition that the rotation of the rotor will bring about unwanted contact between the projection and the tab.

If the bail arm 12 is cocked the kick lever 19 slides to the left as viewed in FIG. 1, due to the force of the spring 20, thereby engaging the detent 21 in the cam face opening 32, whereby the bail arm is securely latched. Simultaneously, the upright portion 23 of the lever 19 is also moved to the left, as viewed in FIG. 1, into the path of the trip tab 26.

If the handle is turned to rotate the rotor with the bail arm cocked, the projection 39 will engage the tab 26 to thereby cam the kick lever 19 to the right in FIG. 1 and unlatch or release the bail arm. The tensioned spring 16 will then swing the bail arm toward the rewind position, and as the pivot cam 14 rotates the increasing radius of the cam face 31 will urge the kick lever farther to the right, against the force of the spring 20, until the detent 21 reaches the large radius portion $b$ of the cam face, at which position the projection 39 is fully removed from the path of the trip tab 26. Reference numerals 33 in FIG. 1 designate cover plates for closing the support housings 9, fastened thereto by screws 34. Reference numeral 31' in FIG. 6 designates an upstanding abutment extending radially inwardly from the cam sleeve portion 30 for haltingly engaging a similar abutment or stopping lug (not shown) integral with the support housing 9 and disposed in the rotational path of the abutment 31', to thereby limit the return travel of the released bail arm and pivot cam.

The force of the kick lever impact is adjustable by merely changing the curvature of the arcuate face 26' of the trip tab 26.

Figure 3:
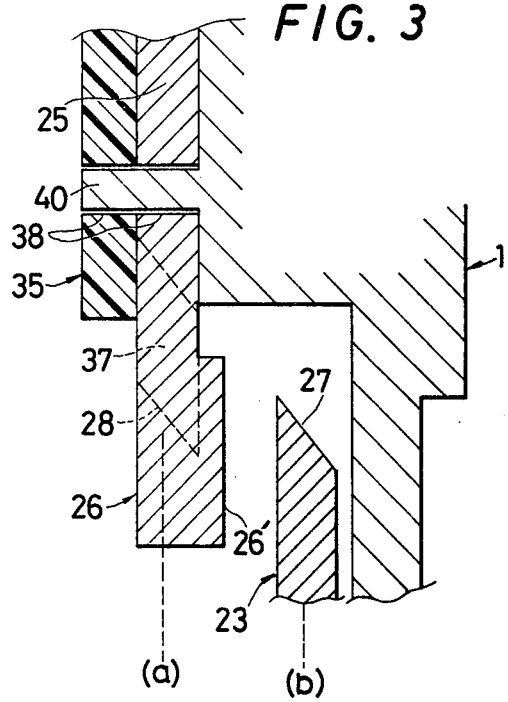
FIG. 3 shows an enlarged sectional view of the essential parts of the bail release preventing device shown in FIG. 1.
Figure 4:
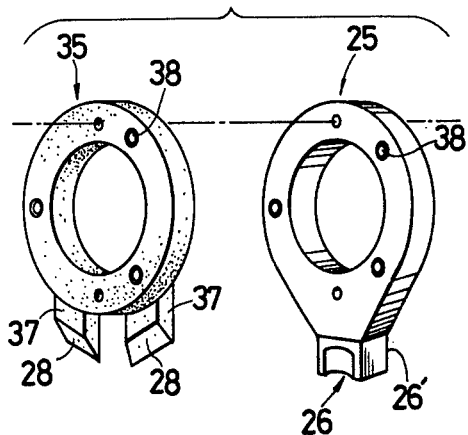
FIG. 4 shows an exploded perspective view of the kick lever key plate and the braking tab plate.

Everything described thus far is also disclosed in (U.S./German) application Ser. No. 773,737 filed on Mar. 2, 1977. The primary feature of the present invention, as discussed earlier, concerns an overrideable friction brake device for engaging the kick lever projection during the free rotation of the rotor 8 due to eccentric weight distribution before the projection reaches the trip tab 26, to thereby prevent the premature and inadvertent release of the cocked bail arm. This feature is implemented by a brake plate 35 disposed over the key plate 25 and mounted to the reel body 1 by screws 36 extending through the key plate. Alignment is implemented by posts 40 integral with the reel body extending through holes 38 in the key plate and brake plate. The latter has a pair of flexible, spaced, downwardly projecting brake tabs 37 having angularly inclined end surfaces 28 adapted to lightly frictionally engage a similarly angled surface 27 on the kick lever projection 39. The brake tabs 37 are spaced sufficiently apart so that the trip tab 26 is interposed between them with clearance on both sides when the brake plate and key plate are assembled to the reel body. The structural and functional interrelationship between these components is best seen in the flattened presentation shown in FIG. 2(b), wherein the kick lever projection 39 travels along path $b$ when the bail arm is in the released or retrieve position. Under these conditions the projection 39 does not strike or engage either the brake tabs 37 or the trip tab 26 when the rotor 8 is driven by the handle 5 to wind in or retrieve the fishing line. When the bail arm is cocked, however, the kick lever projection 39 moves to the left in FIGS. 1 and 3 to thereafter travel along path $a$ in FIG. 2(b). Under these conditions, if the rotor 8 begins to turn or revolve due to eccentric weight distributions during a casting movement, for example, the sloping surface 27 of the kick lever projection 39 will encounter the sloping surface 28 of one of the brake tabs 37 before it reaches the trip tab 26. When these elements meet the brake tab 37 frictionally engages the projection 39 to thus arrest any further rotational movement of rotor 8 and thereby prevent the projection 39 from striking the trip tab 26 and inavertently releasing the cocked bail arm.

This frictional braking engagement is relatively light, and owing to the flexibility of the brake tabs 37, may be easily overridden by rotating the handle 5 when it is desired to release the bail arm and retrieve the line. That is, by simply turning the reel handle 5 the fricitonally arrested projection 39 bends back the flexible brake tab 37 in a "camming" manner to override and pass across the brake tab, whereby the kick lever projection thereafter continues on to subsequently strike the trip tab 26 and thus release the cocked bail arm.

Thus, in this very simple and straightforward manner the inadvertent release of the cocked bail arm is effectively prevented and the dire consequences thereof completely avoided. The only additional element of structure involved is the brake plate 35 with its sloping tabs 37, and this part may be simply and inexpensively fabricated from any suitable flexible material, such as plastic, fiberboard, or the like.

What is claimed is:

1. In a spinning reel including a bail arm 12 pivotally mounted at both ends on diametrically opposite sides of a rotor 8 for swinging movement thereacross between a cocked and a rewind position, a torsion spring 16 biasing the bail arm toward the rewind position, an L-shaped kick lever 19, a C-shaped pivot cam 14 mounted on one end of the bail arm, the kick lever and the pivot cam being slidably and pivotally mounted, respectively, on a support housing 9 of the rotor, a spring 20 biasing the kick lever toward the pivot cam and into engagement therewith, and a key plate 25 mounted to a reel body 1 and having a trip tab 26 disposed in the rotational path of a projection 39 on the kick lever when the bail arm is cocked, the kick lever locking the pivot cam and bail arm in the cocked position, and adapted to be cammed toward the reel body to a retracted position, following rotation of the rotor, to thereby release the bail arm and pivot cam; the improvement characterized by:

brake means disposed in the path of travel of the kick lever projection when the bail arm is cocked for frictionally engaging said projection before it reaches the trip tab to thereby arrest the rotation of the rotor and prevent the premature and inadvertent release of the cocked bail arm.

2. A spinning reel as defined in claim 1, wherein the brake means comprises a pair of flexible brake tabs disposed on opposite sides of the trip tab and spaced therefrom, said tabs being configured to slidingly frictionally engage the kick lever projection with sufficient force to arrest the rotation of the rotor but with insufficient force to prevent the overriding of such frictional engagement upon the intentional rotation of the rotor by the reel handle.

3. A spinning reel as defined in claim 2, wherein the brake tabs have angularly inclined end surfaces, and the kick lever projection has a similarly angularly inclined end surface.

4. A spinning reel as defined in claim 3, wherein the brake tabs are formed of a resilient material such as plastic.

* * * * *